United States Patent Office 3,155,465
Patented Nov. 3, 1964

3,155,465
BORON COMPOUNDS AND COMPOSITIONS
CONTAINING THE SAME
Richard J. De Gray, Shaker Heights, and William O. Fitz-
gibbons, Warrensville Heights, Ohio, assignors to The
Standard Oil Company, Cleveland, Ohio, a corporation
of Ohio
No Drawing. Filed Mar. 27, 1962, Ser. No. 182,958
11 Claims. (Cl. 44—63)

This invention relates to novel boric acid esters and to their use as biocidal additives for petroleum stocks.

The compounds of this invention are represented by the following formula:

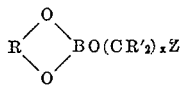

where R is a member selected from the group consisting of beta alkylene of 3 to 8 carbon atoms; $x$ is an integer from 1 to 2; R' is selected from the group consisting of hydrogen and alkyls of 1 to 2 carbon atoms; Z is an oxygenated group containing no more than 10 carbon atoms, selected from the group consisting of

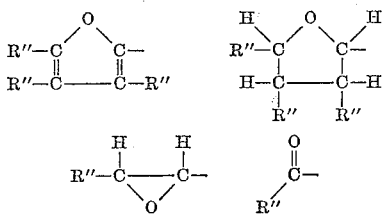

and

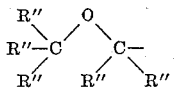

where R" is selected from the group consisting of hydrogen and alkyls of 1–4 carbon atoms.

These compounds have excellent hydrolytic stability in the presence of moisture and are readily soluble in petroleum stocks.

U.S. Patent 2,839,564 to Garner discloses compounds having the formula:

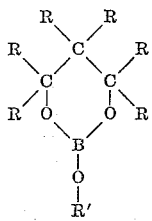

in which R represents a member of the group consisting of hydrogen, and monovalent hydrocarbon radicals including alkyl, cycloalkyl, aryl, aralkyl, and alkaryl, and R' represents a monovalent hydrocarbon radical including alkyl, cycloalkyl, aryl, aralkyl, and alkaryl groups.

These prior art compounds are considerably less stable to hydrolysis than are the compounds of the present invention. In fact, where R' in the prior art compound is methyl, ethyl, or propyl, it is extremely difficult to isolate the tri-ester compounds because they revert back too readily to the diester by releasing alcohol.

One possible explanation of this vast difference in hydrolytic stability is that the presence of oxygen in the substituent attached to the non-nuclear oxygen atom of the ester molecule may be responsible for the reduced hydrolytic sensitivity of the compounds of the present invention. It is well known that under certain conditions, boron exhibits a strong tendency to form a fourth bond to complete its octet of valency electrons and that the tetracoordinated boron atom has a stabilizing effect on a molecule. It is hypothesized that the oxygen in the aforementioned substituent may facilitate the tetracoordination of the boron atom, with the formation of a hetero ring type structure, of five or six members.

By way of example only, tetracoordination of the boron atom in the reaction product of a glycol borate with glycidol would produce a five member hetero ring type structure:

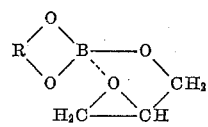

where R is defined the same as above, in connection with the first disclosed formula.

Analogously, tetracoordination of the boron atom in the reaction product of a glycol borate with 3-methoxy-1-propanol would produce a six member hetero ring type structure:

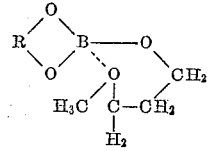

where R is defined the same as above in connection with the first disclosed formula.

In an effort to confirm the above hypothesis, NMR spectra were run on 1:1 (molar) hexylene glycol; the methyl ester of hexylene glycol, as representative of Garner's prior art compounds; the methoxy ethyl ester of hexylene glycol, as representative of the compounds of the present invention; and trimethyl borate, as a standard. A boron probe was employed.

Hexylene glycol borate and the methyl ester of hexylene glycol borate produced identical patterns, namely the same single sharply defined peak associated with the standard trimethyl borate, as indicative of coplanar (trihedral) boron bonding. The conclusion drawn was that the boron bonding in hexylene glycol borate, and in the methyl ester of hexylene glycol borate was identical to that of the standard trimethyl borate, viz. coplanar.

The pattern for the methoxy ethyl ester of hexylene glycol borate showed some of this same peak modified with a shoulder, indicating an up-field shift boron resonance. This pattern was interpreted as reflecting the existence of an equilibrium between coplanar and tetrahedral boron bonding. The latter bonding configuration can exist only where the boron atom is tetracoordinated. Hence the NMR data would seem to support the proffered hypothesis. Theoretical considerations aside, however, the improved hydrolytic stability of the compounds of this invention is a demonstrated fact, as will be shown by the experimental data recorded hereinafter.

The degrading effect of microbiological life on petroleum stocks is a widely recognized phenomenon. Species of bacteria and fungi normally found in soil and ground water have been found also to exist in the water invariably present in the bottoms of petroleum stock storage vessels. These species derive their nutrition from petroleum hydrocarbons as well as from trace elements found in water bottoms. This metabolism consumes hydrocarbons, promotes corrosion and rusting and generates undesirable byproducts such as hydrogen sulfide, gums, peroxides, acids, colored substances and filamentous material.

Tests have shown that while microbiological life in a two-phase hydrocarbon-water system is concentrated at the interface between the phases, life does exist and proliferate in the interior of each phase. Consequently, to effect the complete sterilization of such a system, it is necessary to provide lethal doses of biocide in each phase as well as at the interface between the phases.

The compounds of the invention are capable of essentially completely sterilizing a hydrocarbon-water system. Their effectiveness stems from the fact that in addition to being hydrocarbon soluble, they are capable of undergoing limited extraction from hydrocarbon solution into water. In this manner, when a biocidal compound of this invention is added to a petroleum stock which is then brought into contact with water, some of the original charge of biocide will migrate from the hydrocarbon phase, through the hydrocarbon-water interface and into the water phase, snuffing out life as it goes. It will be apparent that the biocidal effectiveness of these compounds against microbiological life present in a water phase will depend upon the extent to which the compounds undergo water extraction.

The extent to which these compounds are water extractable will vary with the molecular weight of the compound. Generally the higher the molecular weight, the lower the extent of water extraction. For some uses, it may be desirable to employ a biocidal additive consisting of two or more compounds of this invention, at least one of which undergoes extensive water extraction and at least one of which undergoes limited water extraction.

Moreover, the extent of water extraction of a given compound may be varied by employing the compound in conjunction with a material which is a mutual solvent for hydrocarbons and for water. This phenomenon will be described more fully hereinafter.

The compounds of this invention may be added to any petroleum stock susceptible to degradation by microbiological attack. Specific petroleum stocks contemplated include gasoline, kerosine, diesel fuel, jet fuel, home heating oil, hydraulic fluids, paint solvents, dry cleaning solvents, greases, waxes and lubricating oils. These stocks may contain any of the conventional additives normally associated with them, such as detergents, anti-icing compounds, anti-oxidants, gum inhibitors, rust inhibitors, solvent oils, organo-lead compounds, viscosity index improvers, dyes and deodorizers, stabilizers and the like.

The concentration of biocide required to effect essentially complete sterilization will vary depending on a number of factors including the nature of the petroleum stock to be treated and the density of microbial population vis-à-vis the extent of kill required. Generally an amount of biocide equivalent to 0.0004 wt. percent elemental boron (based on the weight of petroleum stock) is the minimum concentration which will provide an essentially complete kill. Under some conditions concentrations up to .01 wt. percent boron may be required. While there is no practical upper limit, it can be said that concentrations in excess of 0.1 wt. percent boron cannot generally be economically justified.

The compounds of this invention may be prepared by reacting one or more glycol borates or precursors thereof with one or more oxygen-containing alcohols.

For purposes of this disclosure, an oxygen-containing alcohol is defined as an alcohol containing oxygen in addition to that present as a hydroxyl group selected from the group of alcohols consisting of

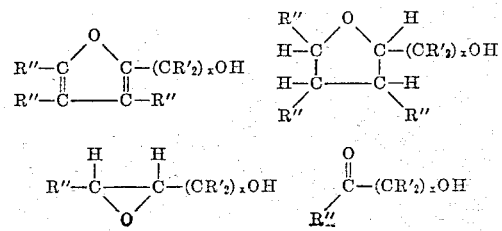

and

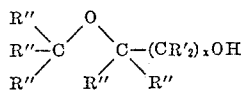

where R', R" and x are defined the same as above in connection with the first disclosed formula. A number of variations of this reaction are shown below.

I. Equimolar additions of oxygen-containing alcohol and 1:1 (molar) glycol borate:

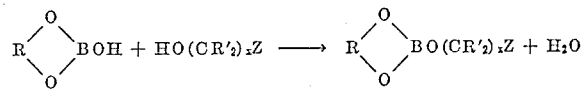

II. Addition of two moles of oxygen-containing alcohol to one mole of 2:2 (molar) glycol borate:

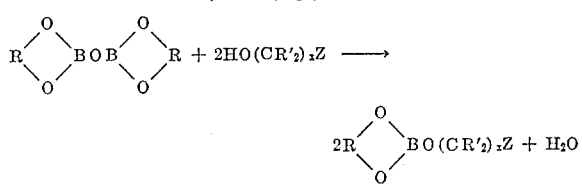

III. Equimolar additions of oxygen-containing alcohol, boric acid and a glycol:

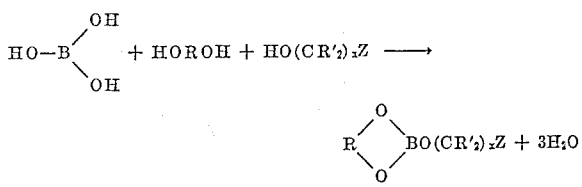

In each equation, R, R' and Z and x are defined the same as above, in connection with the first disclosed formula.

Specific oxygen-containing alcohols which may be reacted with glycol borates according to this invention include:

Furfuryl alcohol
Tetrahydro furfuryl alcohol
Methyl-2-furancarbinol
Glycidol
Diacetone alcohol
4-pentanol-3-methyl-2-one
2-methoxy-1-ethanol
3-methoxy-1-propanol
2-ethoxy-1-ethanol
2-butoxy-1-ethanol Specific 1:1, 2:2 and 3:2 (molar) glycol borates which may be reacted with oxygen-containing alcohols according to this invention include:

1,3-propylene glycol borate
1,3-butylene glycol borate
2,2-dimethyl-1,3-propane diol borate
2-methyl-2,4-pentane diol borate (hereinafter referred to as hexylene glycol borate)
2,2-diethyl propane diol borate
2-ethyl-1,3-hexane diol borate The above reactions are preferably carried out in the presence of a non-polar hydrocarbon solvent such as isooctane, benzene, toluene, or a xylene, and may also be carried out in situ in the particular petroleum hydrocarbon stock for which biocidal protection is desired. Water produced by these reactions can be either removed by azeotropic or other distillation or by chemical absorption. Suitable chemical absorbents include sodium sulfate, calcium sulfate, calcium chloride and the like. Where water is to be removed azeotropically, and the oxygen-containing alcohol employed boils below the azeotrope temperature, it is recommended that the alcohol be added drop-wise to a solvent solution of glycol borate under agitation, and that the distillation be commenced shortly before the first addition of alcohol. This procedure will ensure complete and immediate reaction of the alcohol with the glycol borate and thus essentially eliminate loss of alcohol which might otherwise be vaporized and carried off with the water-solvent azeotrope.

Reaction III has the advantage of obviating the need for a separate step to prepare the glycol borate.

EXAMPLE I

The following materials in the quantities indicated were added to a glass bottle:

| | Grams |
|---|---|
| Crystalline 1:1 (molar) hexylene glycol borate | 14.4 |
| Glycidol | 7.4 |
| Isooctane | 65.4 |
| Drierite (anhydrous calcuim sulfate produced by W. A. Hammond Drierite Co., Xenia, Ohio) | 26.4 |

The bottle was tightly stoppered, and maintained under slight agitation at 55° C. overnight. The product was separated from the calcium sulfate by filtration.

EXAMPLE II

The following materials in the quantities indicated were added to a glass bottle:

| | Grams |
|---|---|
| 2:2 (molar) 1,3-butylene glycol borate | 10.7 |
| Diacetone alcohol | 11.6 |
| Anhydrous sodium sulfate | 3.0 |

The bottle was tightly stoppered, shaken, and maintained at room temperature until the reaction mix was free of turbidity (indicating that all of the evolved water of reaction had been absorbed by the sodium sulfate). The product was recovered by decantation.

EXAMPLE III

The following materials in the quantities indicated were added to a flask equipped with a dropping funnel and a condensing facility with a water trap:

| | | |
|---|---|---|
| 1,3 butylene glycol | grams | 6.30 |
| 2-methyl-2,4-pentane diol (hexylene glycol) | do | 3.54 |
| Boric acid | do | 6.18 |
| Toluene | ml | 100 |

The mixture was heated with stirring at reflux until one ml. of water of reaction was removed by azeotropic distillation, whereupon 7.60 grams of 2-methoxy-1-ethanol were introduced dropwise from the dropping funnel into the flask. Heating and azeotroping were continued beyond the last addition of alcohol until the evolution of water ceased.

EXAMPLE IV

The following materials in the quantities indicated were added to a flask equipped with a dropping funnel and a condensing facility with a water trap:

Boric acid, 12.36 grams.
2-methyl-2,4-pentane diol (hexylene glycol), 23.60 grams.
Toluene, 100 ml.

The mixture was heated with stirring at reflux until one ml. of water of reaction was removed by azeotropic distillation, whereupon 15.20 grams of 2-methoxy-1-ethanol was introduced dropwise from the dropping funnel into the flask. Heating and azeotroping were continued beyond the last addition of alcohol until the evolution of water ceased.

EXAMPLE V

The following materials in the quantities indicated were added to a glass bottle:

| | Grams |
|---|---|
| 1:1 (molor) 1,3-butylene glycol borate | 11.6 |
| Furfuryl alcohol | 9.8 |
| Drierite | 26.4 |

The bottle was tightly stoppered, shaken, and maintained at room temperature until the reaction mix was free of turbidity (indicating that all the evolved water of reaction had been absorbed by the Drierite). The product was recovered by decantation.

EXAMPLE VI

The following materials in the quantities indicated were added to a glass bottle:

| | Grams |
|---|---|
| 1:1 (molar) 1,3-butylene glycol borate | 11.6 |
| Tetrahydrofurfuryl alcohol | 10.8 |
| Drierite | 26.4 |

The bottle was tightly stoppered, shaken, and maintained at room temperature until the reaction mix was free of turbidity (indicating that all of the evolved water of reaction had been absorbed by the Drierite). The product was recovered by decantation.

*Hydrolytic Stability*

A series of test solutions were prepared by admixing 25 wt. percent of a boron compound with 75 wt. percent of isooctane.

The solutions were tested in a humidity cabinet containing air at room temperature which was saturated with water and isooctane vapors, to provide an atmosphere containing 100% relative humidity.

Microscope slides were placed in the cabinet, and two drops of test solution were deposited on the slides. The hydrolytic stability was measured in terms of the time elapsed until the appearance of the "first blush" of precipitate indicating the formation of detectable quantities of hydrolysis products. The results of the tests are recorded below:

TABLE I

| Run | Boron Compound | Time to "first blush" |
|---|---|---|
| 1 | Ethyl ester of hexylene glycol borate | 26 seconds. |
| 2 | n-Propyl ester of hexylene glycol borate | 85 seconds. |
| 3 | Methoxy ethyl ester of hexylene glycol borate | 40 minutes. |
| 4 | Reaction product of hexylene glycol borate with diacetone alcohol. | 48 minutes. |
| 4 | Reaction product of hexylene glycol borate with diacetone alcohol. | 48 minutes. |
| 5 | Reaction product of hexylene glycol borate with furfuryl alcohol. | 90+ minutes |
| 6 | Reaction product of hexylene glycol borate with glycidol. | 165 minutes. |

Runs 1 and 2 were made using compounds of the prior art while runs 3, 4, 5 and 6 were made using compounds of the present invention. It is clear that the compounds of the present invention possess markedly superior hydrolytic stability.

*Biocidal Activity*

A series of 400 ml. test samples were prepared, each having the following composition:

| | |
|---|---|
| Bushnell-Haas mineral salts [1] | 3.5 ml. |
| "Conditioned inoculum"[2] | 0.5 ml. |
| Boron compound | Enough to provide 40 p.p.m. elemental boron in the fuel. |
| Commercial turbine fuel | Enough to make up 400 ml. |

[1] Bushnell and Haas: "The Utilization of Certain Hydrocarbons by Microorganisms," J. of Bacteriology, vol. 41, pp. 653–673 (1941).
[2] A water suspension of mixed cultures of bacteria and fungi collected over a period of time from a number of petroleum stock storage facilities, held in intimate contact with commercial turbine fuel for 30 days or more.

Additional samples were prepared for use as blanks, and had the same composition indicated above except that these contained no boron compound.

Each sample was placed in a tightly sealed bottle, and the resultant series of bottles were mounted along radii of a large rotatable wheel. The wheel was then rotated at 3 r.p.m. for a period of four days, whereby the contents of the bottles were subjected to a substantially continuous sloshing action during the time indicated.

Following this, a portion of the aqueous phase of each sample was removed from the bottles and plates were poured (on nutrient agar) using a standard centade dilution procedure. The plates were incubated for 48 hours at 30° C. The plates were then subjected to microbiological count.

The procedures followed for pouring plates, incubating and counting will be found in the book "Standard Methods for the Examination of Water and Sewage," American Public Health Association, 9th Ed. (1946).

The table below shows the biocidal activity of the compound prepared in accordance with Example IV described hereinabove:

TABLE II

| Additive | Count (organisms/ml.) | Percent Kill |
|---|---|---|
| None | >300×10⁵ | 0 |
| Example IV (40 p.p.m. boron) | 20×10⁵ | 93.3 |

As previously noted, the extent to which compounds of this invention undergo water extraction can be adjusted by employing a material which is a mutual solvent for hydrocarbons and for water. It has also been pointed out that the effectiveness of the compounds of this invention against microbiological life present in a water phase will depend upon the extent to which the compounds are water extractable.

A particularly suitable mutual solvent has been found to be the same oxygen-containing alcohol from which a particular boron compound is formed. For example, where the compound used is the methoxy ethyl ester of a glycol borate, the mutual solvent would be methoxy ethanol.

To show the effect of a mutual solvent on the bactericidal potency of the compounds of this invention, the same biocidal activity test described above was repeated using as the "boron compound" ingredient, a mixture of the methoxy ethyl ester of hexylene glycol borate and an excess of 2-methoxy-1-propanol. The results of this test are shown in the table below:

TABLE III

| Additive | Count (organisms/ml.) | Percent Kill |
|---|---|---|
| None | >300×10³ | 0 |
| Example IV (40 p.p.m. boron)+11.8 moles of 2-methoxy-1-propanol/mole of boron compound. | 60×10⁴ | 99.8 |

It will be seen that the presence of excess 2-methoxy-1-ethanol as the mutual solvent increased the kill from 93.3% to 99.8%. This entire improvement is attributed to an increase in the extent of water extractability of the boron compound, since the mutual solvent has no independent biocidal activity.

Additional tests have shown that the following correlation exists between the extent of water extractability of a boron compound of this invention, and the number of moles of mutual solvent present:

TABLE IV

| Mutual Solvent (per mole of boron compound) | Extent of Water Extractability |
|---|---|
| None | 1 |
| 1 mole | 2X |
| 5 moles | 5X |

Up to 25 moles of mutual solvent per mole of boron compound may be advantageously used to increase the extent of water extractability of a boron compound of this invention and hence increase its effectiveness against microbiological life in the water phase. While the preferred mutual solvent is the same oxygen-containing alcohol from which a particular boron compound is formed, it will be apparent that any mutual solvent may be used for this purpose.

It is to be understood that various modifications of the present invention will occure to those skilled in the art upon reading the foregoing disclosure. It is intended that all such modifications be covered which reasonably fall within the scope of the appended claims.

We claim:
1. A compound having the formula:

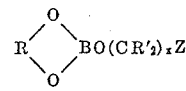

where R is selected from the group consisting of beta alkylene of 3 to 8 carbon atoms; $x$ is an integer from 1 to 2; R' is selected from the group consisting of hydrogen and alkyls of 1 to 2 carbon atoms; and Z is an oxygenated group containing not more than 10 carbon atoms selected from the group consisting of

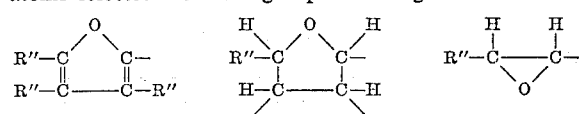

where R'' is selected from the group consisting of hydrogen and alkyls of 1-4 carbon atoms.

2. A compound having the formula:

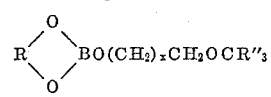

where R is selected from the group consisting of beta alkylene of 3 to 8 carbon atoms; $x$ is an integer from 1 to 2; and R'' is selected from the group consisting of hydrogen and alkyls of 1-4 carbon atoms.

3. The compound of claim 2 in which R is

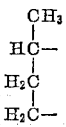

$x$ is 1, and R'' is hydrogen.

4. The compound of claim 2 in which R is

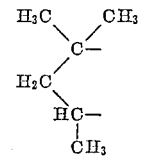

$x$ is 1, and R'' is hydrogen.

5. The compound

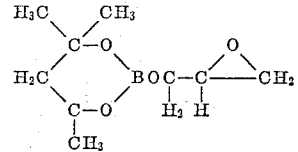

6. A petroleum hydrocarbon stock containing a compound having the formula

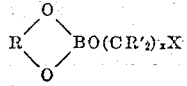

where R is selected from the group consisting of beta alkylene of 3 to 8 carbon atoms; $x$ is an integer from 1 to 2; R' is selected from the group consisting of hydrogen and alkyls of 1 to 2 carbon atoms; and Z is an oxygenated group containing not more than 10 carbon atoms, selected from the group consisting of

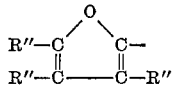 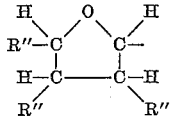 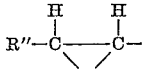

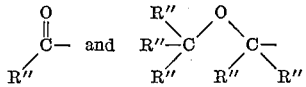

where R" is selected from the group consisting of hydrogen and alkyls of 1-4 carbon atoms, said compound being present in an amount to provide from .0004 to .01 wt. percent elemental boron based on the weight of hydrocarbon.

7. A petroleum hydrocarbon stock of the jet fuel boiling range containing a compound having the formula

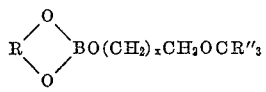

where R is selected from the group consisting of beta alkylene of 3 to 8 carbon atoms; $x$ is an integer from 1 to 2; and R" is selected from the group consisting of hydrogen and alkyls of 1-4 carbon atoms, said compound being present in an amount to provide from .0004 to .01 wt. percent elemental boron based on the weight of jet fuel.

8. The composition of claim 7 in which R is

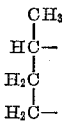

$x$ is 1, and R" is hydrogen.

9. The composition of claim 7 in which R is

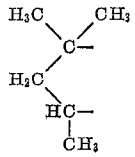

$x$ is 1, and R" is hydrogen.

10. The composition of claim 8 which additionally contains 2-methoxy-1-ethanol in an amount up to 25 moles per mole of boron compound.

11. The composition of claim 9 which additionally contains 2-methoxy-1-ethanol in an amount up to 25 moles per mole of boron compound.

References Cited in the file of this patent

UNITED STATES PATENTS

| | | |
|---|---|---|
| 2,767,069 | Fay et al. | Oct. 16, 1956 |
| 2,839,564 | Garner | June 17, 1958 |
| 2,846,449 | Banford et al. | Aug. 5, 1958 |
| 2,852,533 | Brenner et al. | Sept. 16, 1958 |
| 2,948,597 | Belden | Aug. 9, 1960 |